(12) United States Patent
Tootill

(10) Patent No.: US 8,732,200 B2
(45) Date of Patent: May 20, 2014

(54) SYSTEM AND METHOD FOR CONTROLLING ACCESS TO A DATABASE OBJECT

(75) Inventor: David Andrew Tootill, Mercer Island, WA (US)

(73) Assignee: CA, Inc., Islandia, NY (US)

(*) Notice: Subject to any disclaimer, the term of this patent is extended or adjusted under 35 U.S.C. 154(b) by 146 days.

(21) Appl. No.: 13/371,634

(22) Filed: Feb. 13, 2012

(65) Prior Publication Data
US 2013/0212122 A1    Aug. 15, 2013

(51) Int. Cl.
*G06F 17/00*    (2006.01)

(52) U.S. Cl.
USPC ............................ 707/781; 707/634; 707/758

(58) Field of Classification Search
USPC .................... 707/769, 634, 758, 781
See application file for complete search history.

(56) References Cited

U.S. PATENT DOCUMENTS

| | | | |
|---|---|---|---|
| 2007/0033354 A1* | 2/2007 | Burrows et al. ............... | 711/156 |
| 2009/0282045 A1* | 11/2009 | Hsieh et al. ...................... | 707/9 |
| 2010/0005055 A1 | 1/2010 | An et al. | |
| 2010/0023937 A1* | 1/2010 | Kothari et al. ................ | 717/170 |
| 2010/0125612 A1 | 5/2010 | Amradkar et al. | |
| 2011/0276584 A1 | 11/2011 | Cotner et al. | |

* cited by examiner

*Primary Examiner* — Ajay Bhatia
*Assistant Examiner* — Kurt Mueller
(74) *Attorney, Agent, or Firm* — Baker Botts, L.L.P.

(57) ABSTRACT

According to one embodiment of the present disclosure, a method includes receiving a query from a user, the query requesting access to a database object in a first database table, the database object comprising a first column and a second column. The method also includes determining whether the user is authorized to access the database object based on the first column, and determining whether the user is authorized to access the database object based on the second column. The method further includes allowing the user to access to database object in response to determining the user is authorized to access the database object based on the first column or the second column.

11 Claims, 2 Drawing Sheets

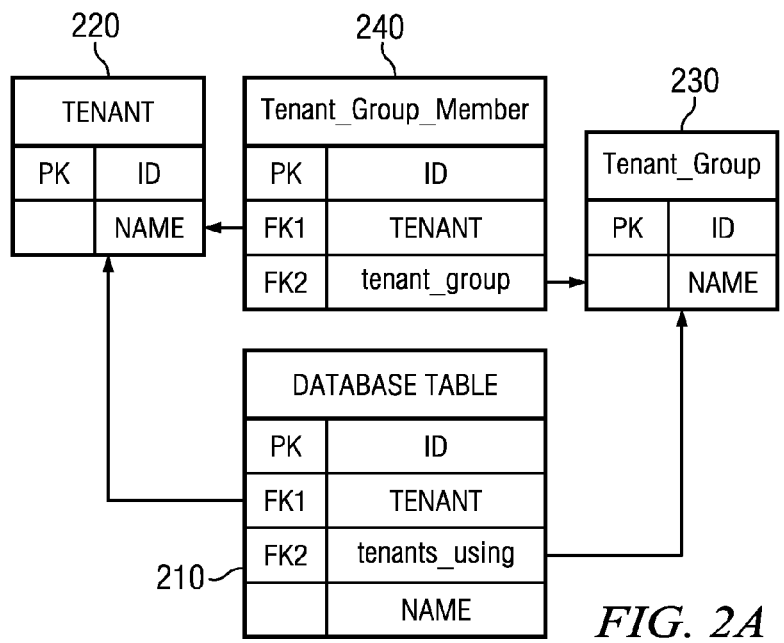
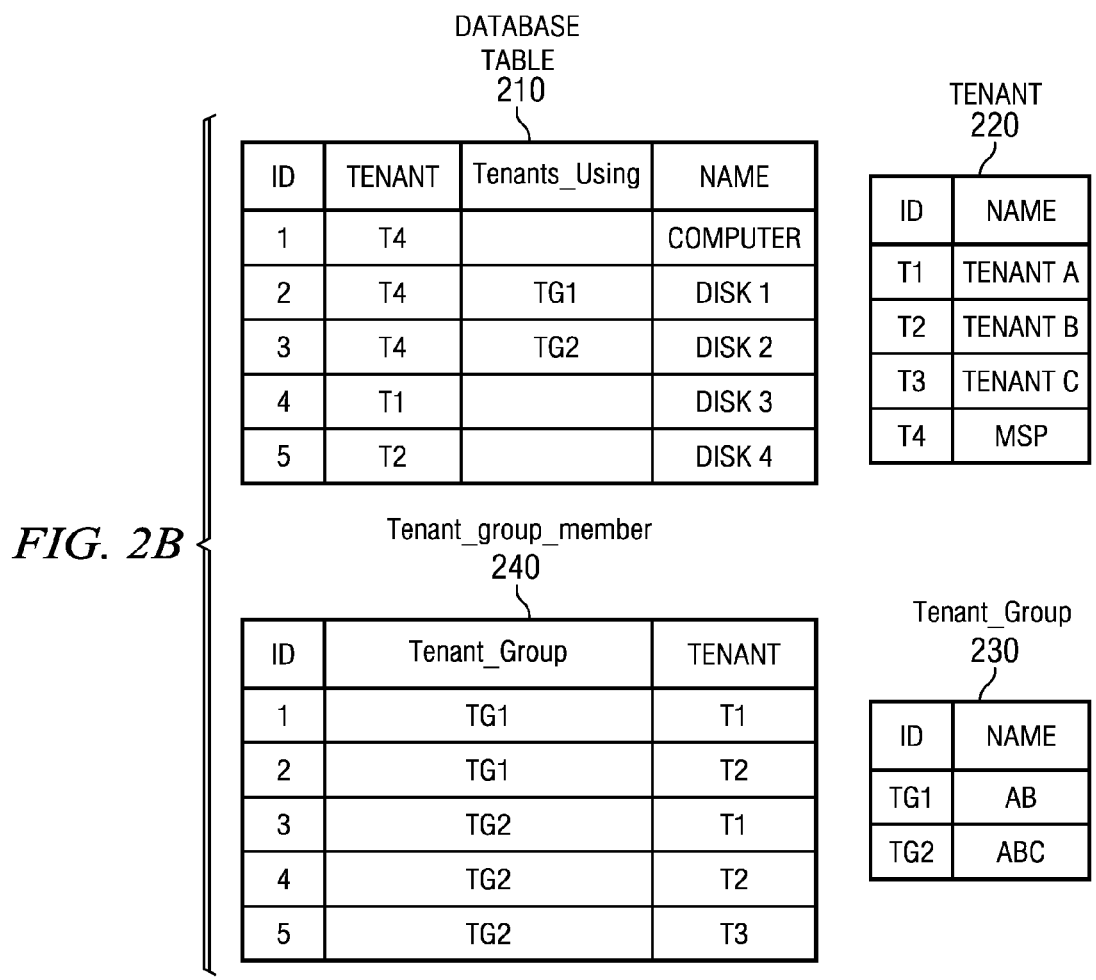

SYSTEM AND METHOD FOR CONTROLLING ACCESS TO A DATABASE OBJECT

TECHNICAL FIELD

The present disclosure relates generally to shared database objects and more particularly to a system and method for controlling access to a shared database object using multi-tenancy reverse striping.

BACKGROUND

In existing systems, implementation of multi-tenancy in a database may be accomplished using a technique called striping, wherein each row of a database comprises a column containing a value that indicates the tenant that may access the data in the row. Users may then be associated with the various tenants, making it possible to structure database queries to return only those results from the rows that a user is authorized to access through his association with the tenant indicated. However, in such systems, it is not easy to implement shared access to certain database objects due to their nature, or to change access authorization to database objects from one group of tenants to another.

SUMMARY

According to one embodiment of the present disclosure, a method includes receiving a query from a user, the query requesting access to a database object in a first database table, the database object comprising a first column and a second column. The method also includes determining whether the user is authorized to access the database object based on the first column, and determining whether the user is authorized to access the database object based on the second column. The method further includes allowing the user to access to database object in response to determining the user is authorized to access the database object based on the first column or the second column.

Technical advantages of the present disclosure include allowing for the sharing of database objects among different groups of tenants. Particular embodiments of the present disclosure may allow for reverse striping of a multi-tenant database, wherein an object may specify those tenants allowed to access it in addition to specifying its own tenant. Some embodiments may seamlessly merge with a multi-tenant striping system, making it easier for a service provider such as a service provider to transfer access rights to an object from one group of tenants to another Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of certain embodiments of the present invention and features and advantages thereof, reference is now made to the following description taken in conjunction with the accompanying drawings, in which:

FIG. 2A illustrates an example database table mapping according to the present disclosure;

FIG. 2B illustrates example database tables according to the present disclosure.

DETAILED DESCRIPTION OF EXAMPLE EMBODIMENTS

Figure 1:
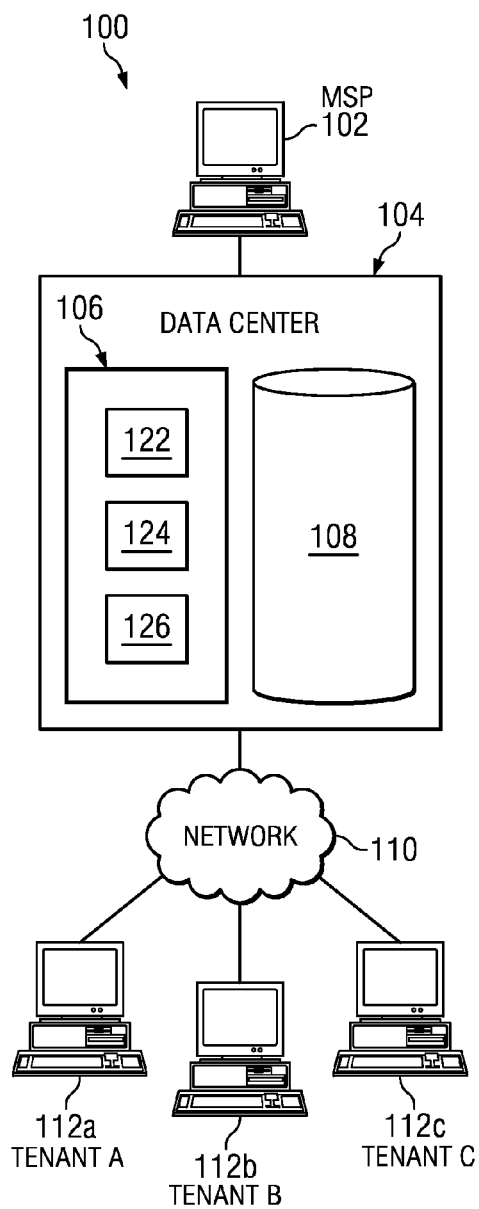
FIG. 1 illustrates a system including a virtualization environment running on shared hardware.
Figure 3:
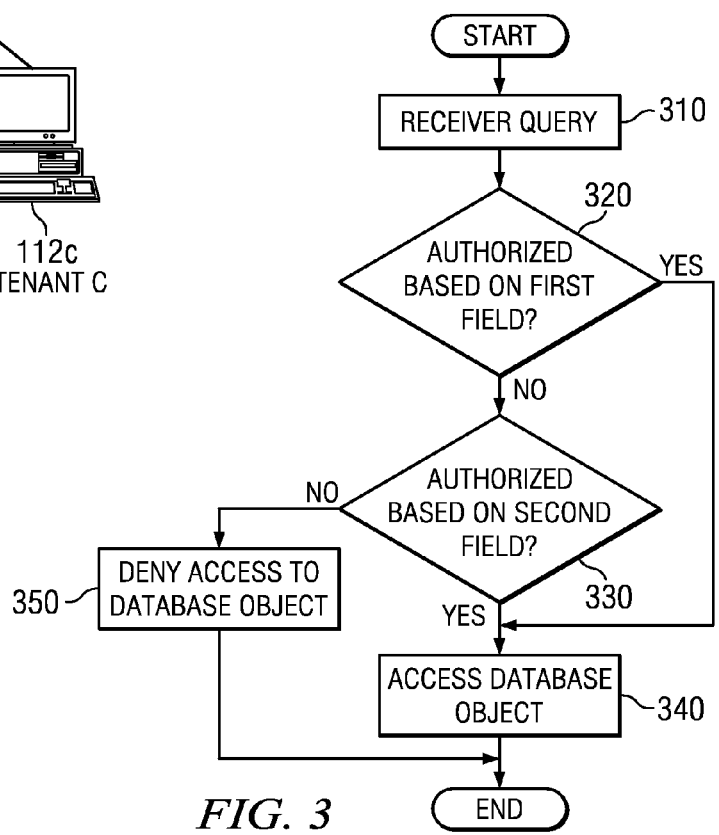
FIG. 3 illustrates an example method for accessing database objects.

Embodiments of the present disclosure and its advantages are best understood by referring to FIGS. 1 through 3 of the drawings, like numerals being used for like and corresponding parts of the various drawings.

FIG. 1 illustrates a system 100 that includes a Managed Service Provider (MSP) 102, a datacenter 104, a network 110, and tenants 112, and may embody aspects of the present disclosure. System 100 may be operable to allow MSP 102 to provide the applications and/or services over network 110 through the use of multi-tenancy. Multi-tenancy may refer to the use of a single instance of software by a plurality of clients. For instance, MSP 102 may manage or control one or more datacenters 104, and may provide network-based services and/or applications to one or more customers, such as tenants 112. MSP 102 may comprise one or more users (not shown) with administrative access to the applications and/or services at datacenter 104. Likewise, tenants 112 may comprise one or more users (not shown) authorized to access and use the applications and/or services at datacenter 104 over network 110.

In existing systems, implementation of multi-tenancy in a database may be accomplished using striping, wherein each row of a database comprises a column containing a value that indicates the tenant that may access the data in the row. Users may then be associated with the various tenants, making it possible to structure database queries to return only those results from the rows that a user is authorized to access through his association with the tenant indicated. However, in such systems, it is not easy to implement shared access to certain database objects due to their nature, or to change access authorization to database objects from one group of tenants to another.

For example, a MSP may wish to allow all tenants to access a configuration item (CI) such as a storage area network (SAN). The MSP may accomplish this using the striping method discussed above by indicating itself as the tenant for such object, and allowing all tenants to access those rows where the MSP is listed as the tenant. However, the MSP may wish to allow only certain tenants to access certain objects, while maintaining exclusive access to certain other objects. The striping method discussed may not be able to sufficiently delineate access authorization between the various tenants and the MSP itself.

Accordingly, at least one aspect of the present disclosure may allow for reverse striping, wherein an object may specify those tenants allowed to access it in addition to specifying its own tenant. Such a system may seamlessly merge with the striping system discussed above, making it easier for a service provider such as a MSP to transfer access rights to an object from one group of tenants to another. For example, in particular embodiments, a database row in a first database table may contain a first additional column indicating the tenant that owns the data in the row (i.e. striping). The database row may also contain a second additional column indicating a group of tenants allowed to access the data in the row (i.e. reverse striping).

In such embodiments, the value in the first additional column may be NULL or may be a foreign key reference to a second database table containing all known tenants. Likewise, the value in the second additional column may be NULL or may be a foreign key reference to a third database table containing all known tenant groups. A fourth database table may then define tenant group membership, and may contain foreign key references to the second and third database tables. In certain embodiments, each query submitted by a user may be modified to test both the striping and reverse striping restrictions such that the user is only allowed to access those rows if he is either: (1) authorized to access the row as a member of the tenant indicated in the first additional column, or (2) authorized to access the row as a member of the group of tenants indicated in the second additional column.

Datacenter 104 may refer to a collection of hardware resources such as a computer system 106 and/or storage 108. Computer system 106 includes a processor 122, memory 124, and an interface 126. As an example, and not by way of limitation, computer system 106 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 106 may include one or more computer systems; be unitary or distributed; span multiple locations; span multiple machines; or reside in a cloud, which may include one or more cloud components in one or more networks.

Processor 122 may refer to any suitable device operable to execute instructions and manipulate data to perform operations for computer system 120. Processor 122 may include, for example, any type of central processing unit (CPU).

Memory 124 may comprise one or more tangible, computer-readable, and/or computer-executable computer readable medium, and may store data, information, and/or instructions operable to be executed by processor 122. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), and/or other computer-readable medium.

Interface 126 may refer to any suitable device operable to receive input for computer system 120, send output from computer system 120, perform suitable processing of the input or output or both, communicate to other devices, or any combination of the preceding. Interface 126 may include appropriate hardware (e.g. modem, network interface card, etc.) and software, including protocol conversion and data processing capabilities, to communicate through a LAN, WAN, or other communication system that allows computer system 120 to communicate to other devices. Interface 126 may include one or more ports, conversion software, or both.

Storage 108 may provide additional data storage capacity and may include database and/or network storage, or any other suitable tangible, computer-readable storage media. In certain embodiments, storage 108 may include network resources, such as a storage area network (SAN) or network-attached storage (NAS).

Network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. Network 110 may connect a plurality of tenants 112.

FIG. 2A illustrates an example database table mapping according to the present disclosure. Likewise, FIG. 2B illustrates example database tables according to the present disclosure. In particular embodiments, each object in database table 210 may be a configuration item (CI) in a configuration management database (CMDB). For example, in some embodiments, each object may represent a single module such as a particular computer or SAN. In some embodiments, each object may represent a complete system such as a group of computers.

In particular embodiments, database table 210 may contain at least three columns for each object in the table. For example, database table 210 may include columns for indicating an ID of the object, a tenant with control of the object, and tenants using the object, as illustrated. In some embodiments, the ID column may comprise a primary key reference, while the tenant and tenants_using columns may each comprise foreign key references to tenant table 220 and tenants_using table 230, respectively. In some embodiments, database table 210 may include additional columns such as a Name column indicating a name of the database object. For example, the name of each object may be listed in the Name column, such as Computer, Disk 1, Disk 2, Disk 3, and Disk 4, as illustrated. Tenant table 220 may include at least one column for each object in the table.

In particular embodiments, tenant table 220 may include a first column for indicating an ID of the tenant, as illustrated. In some embodiments, tenant table 220 may also include a column for indicating a name for each tenant in the table. For instance, the name of each tenant listed in the table may be included in the name column, such as Tenant A, Tenant B, Tenant C, and MSP as illustrated.

Tenant_group table 230 may include at least one column for each tenant group listed in the table. In particular embodiments, tenant_group table 230 may include a first column for indicating an ID of the tenant group, as illustrated. In some embodiments, tenant_group table 230 may also include an additional column for indicating a name for each tenant group in the table. For example, tenant group AB includes Tenants A and B, but not C, while tenant group ABC includes Tenants A, B, and C.

Tenant_group_member table 240 may include at least three columns for each object in the table. In particular embodiments, tenant_group_member table 240 may include columns for indicating an ID of the tenant group member object, a tenant group of the tenant group member object, and the specific tenant in the tenant group for the tenant group member object, as illustrated. In some embodiments, a tenant group member object may be created for each tenant listed in a tenant group. For example, tenant group AB may have two objects in tenant_group_member table 240—one for Tenant A, and one for Tenant B. Likewise, tenant group ABC may have three objects in tenant_group_member table 240—one for Tenant A, one for Tenant B, and one for Tenant C. In some embodiments, the tenant column may contain a foreign key reference to tenant table 220. Similarly, in some embodiments, the tenant_group column may contain a foreign key reference to tenant_group table 230.

As is explained in further detail below, the database table structure shown in FIGS. 2A and 2B may be operable to allow for access to database objects by multiple tenants. For example, according to embodiments of the present disclosure, a user belonging to MSP (with MSP access rights) may be allowed to access database object IDs 1-3 in database table 210. Only users with MSP access rights would be the allowed to access database object ID=1. Likewise, only users belonging to Tenant A (with Tenant A access rights) would be allowed to access database object ID=4, and only users belonging to Tenant B (with Tenant B access rights) would be allowed to access database object ID=5. Furthermore, users with MSP, Tenant A, or Tenant B access rights would be allowed to access database object ID=2, while users with MSP, Tenant A, Tenant B, or Tenant C access rights would be allowed to access database object ID=3.

FIG. 3 illustrates an example method for accessing database objects. The method begins at step 310, where a query is received. In particular embodiments, the query may request access to a database object in a first database table. For example, referring to FIG. 2B, the query could request access to the database object with ID=2 in database table 210.

In some embodiments, the database object may comprise a first column and second column. For example, the database object may comprise a first column indicating the tenant that owns the object or has control over the object, and a second column indicating a group of tenants that have access to the database object. In some embodiments, the first column and second column may each comprise a foreign key reference to another database table. Referring to FIG. 2B, the first column may be the tenant column in database table 210 comprising a foreign key reference to tenant table 220, while the second column may be the tenants_using column in database table 210 comprising a foreign key reference to tenants_using table 230.

At step 320, it is determined whether the user is authorized to access the database object based on the first column of the database object. In particular embodiments, this may be accomplished by determining a first value in the first column of the database object and determining whether the user has access based on the first value.

For example, referring to FIG. 2B, object ID=2 (Disk 1) in database table 210 may have a value of T4 in the first column indicating the tenant that owns the object (MSP). Likewise, database object ID=4 (Disk 3) in database table 210 may have a value of T1 in the first column indicating the tenant that owns the object (Tenant A). This value may indicate the tenant that has control over the database object. Based on this value, it may be determined whether the user has access to the database object. For example, it may be determined that a user with MSP access rights may be allowed to access database object ID=1 based on the value in the first column (MSP), while a user with Tenant A, B, or C access rights may not be able to access the object based on the first value. In some embodiments, the first value may comprise a foreign key reference to another database table. For example, the value may comprise a foreign key reference to a table indicating various attributes of the tenant, such as the name of the tenant. If it is determined that the user is authorized to access the database object based on the first value, the method continues to step 340, where the user is allowed access to the database object.

If it is determined that the user does not have access based on the first value, the method continues to step 330, where it is determined whether the user is authorized to access the database object based on the second column of the database object. In particular embodiments, this may be accomplished by determining a second value in the second column of the database object and determining whether the user has access based on the second value.

For example, referring to FIG. 2B, database object ID=2 (Disk 1) in database table 210 may have a value of TG1 in the second column, indicating the group of tenants that may access the object (tenant group AB). Based on this, it may be whether the user has access based on the second value. For example, it may be determined that a user with Tenant A or Tenant B access rights may also access the object based on the second value in the second column (TG1) in addition to the tenant listed in the first column. As another example, database object ID=1 (Computer) in database table 210 may have a value of NULL in the second column, indicating that no tenants may access the object other than the tenant listed in the first column.

In further embodiments, determining whether the user is authorized to access the database object based on the second column of the database object may be accomplished by accessing a row in a second database table. In certain embodiments, the row in the second table may comprise a third column and a fourth column. In some embodiments, it may be determined whether the second value matches a third value in the third column. In further embodiments, if the second value is found to match the third value, it may then be determined whether the user has access to the database object based on a fourth value in the fourth column.

For example, referring to FIG. 2B, tenant_group_member table 240 may be accessed. If the user is attempting to access database object ID=2 (Disk 1) in database table 210, it may be determined whether there exists a row in tenant_group_member table 240 that contains the value TG1 in the tenant_group column. After determining the rows with TG1 as the value in the tenant_group column, it may then be determined whether the user may access the object based on whether any of these rows has a corresponding tenant column to which the user has access rights. For example, if the user has Tenant A access rights, it may be determined that the user may access the database object in database table 210 based on row ID=1 in tenant_group_member table 240 containing a value of T1 in the tenant column. If it is determined that the user is authorized to access the database object based on the second column, the method continues to step 340, where the user is allowed access to the database object. If, instead, it is determined that the user is not authorized to access the database object based on either the first or second columns in the database object, the method continues to step 350, where the user is denied access to the database object.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:
1. A method, comprising:
  receiving a query from a user, the query requesting access to a database object in a first database table;
  accessing a row in the first database table associated with the database object, the row of the first database table comprising a first column and a second column, the first column comprising an owner of the database object and the second column comprising a group identifier;
  determining whether the user is an owner of the database object based on the first column;

in response to determining that the user is not an owner of the database object, determining whether the user is authorized to access the database object by:
  accessing a row in a second database table, the row in the second database table comprising a third column comprising a group identifier and a fourth column comprising a user identifier;
  determining that the group identifier in the second column of the first database table matches the group identifier in the third column of the second database table; and
  determining whether the user is authorized to access the database object based on the user identifier in the fourth column of the second database table; and
allowing the user to access the database object in response to determining the user is authorized to access the database object.

2. The method of claim 1, further comprising modifying the query to include instructions for determining whether the user is authorized to access the database object based on the first column or the second column.

3. The method of claim 1, wherein determining whether the user is listed as an owner of the database object comprises:
determining a first value in the first column; and
determining whether the user has access to the database object based on the first value.

4. The method of claim 1, wherein:
the first column comprises a foreign key reference to a third database table;
the second column group identifier comprises a foreign key reference to a fourth database table;
the group identifier in the third column comprises a foreign key reference to the fourth database table; and
the user identifier in the fourth column comprises a foreign key reference to the third database table.

5. A system, comprising:
a memory; and
one or more processors operable, upon executing one or more instructions stored in the memory, to:
  receive a query from a user, the query requesting access to a database object in a first database table:
  access a row in the first database table associated with the database object, the row of the first database table comprising a first column and a second column, the first column comprising an owner of the database object and the second column comprising a group identifier;
  determine whether the user is an owner of the database object based on the first column;
  in response to determining that the user is not an owner of the database object, determine whether the user is authorized to access the database object by:
    accessing a row in a second database table, the row in the second database table comprising a third column comprising a group identifier and a fourth column comprising a user identifier;
    determining that the group identifier in the second column of the first database table matches the group identifier in the third column of the second database table; and
    determining whether the user has access to the database object based on the user identifier in the fourth column of the second database table; and
  allow the user to access the database object in response to determining the user is authorized to access the database object.

6. The system of claim 5, wherein the one or more processors are further operable to modify the query to include instructions for determining whether the user is authorized to access the database object based on the first column or the second column.

7. The system of claim 5, wherein the one or more processors operable to determine whether the user is listed as an owner of the database object are further operable to:
determine a first value in the first column; and
determine whether the user has access to the database object based on the first value.

8. Logic encoded in a non-transitory computer readable storage medium, the logic comprising instructions that when executed on a processor are operable to:
receive a query from a user, the query requesting access to a database object in a first database table;
  access a row in the first database table associated with the database object, the row of the first database table comprising a first column and a second column, the first column comprising an owner of the database object and the second column comprising a group identifier;
determine whether the user is an owner of the database object based on the first column;
in response to determining that the user is not an owner of the database object, determine whether the user is authorized to access the database object by:
  accessing a row in a second database table, the row in the second database table comprising a third column comprising a group identifier and a fourth column comprising a user identifier;
  determining that the group identifier in the second column of the first database table matches the group identifier in the third column of the second database table; and
  determining whether the user has access to the database object based on the user identifier in the fourth column of the second database table; and
allow the user to access the database object in response to determining the user is authorized to access the database object.

9. The logic of claim 8, wherein the one or more instructions are further operable to modify the query to include instructions for determining whether the user is authorized to access the database object based on the first column or the second column.

10. The logic of claim 8, wherein the one or more instructions operable to determine whether the user is listed as an owner of the database object are further operable to:
determine a first value in the first column; and
determine whether the user has access to the database object based on the first value.

11. A method, comprising:
receiving a query from a user, the query requesting access to a database object in a first database table:
accessing a row in the first database table associated with the database object, the row of the first database table comprising a first column and a second column, the first column comprising an owner of the database object and the second column comprising a group identifier;
modifying the query to include instructions for determining whether the user is authorized to access the database object based on the first column or the second column;
determining whether the user is an owner of the database object based on a first value in the first column;
in response to determining that the user is not an owner of the database object, accessing a row in a second database table, the row in the second database table comprising a third column comprising a group identifier and a fourth column comprising a user identifier;

determining that the group identifier in the second column of the first database table matches the group identifier in the third column of the second database table;

determining whether the user is authorized to access the database object based on the user identifier in the fourth column of the second database table, in response to determining that the group identifier in the second column of the first database table matches the group identifier in the third column of the second database table; and allowing the user to access the database object in response to determining the user is authorized based on the first column or the user identifier in the fourth column.

\* \* \* \* \*